(12) United States Patent
Owen

(10) Patent No.: US 8,339,663 B2
(45) Date of Patent: Dec. 25, 2012

(54) ENCODING OF NON-INDEXED DATA FOR PRINTING USING INDEXED RGB

(75) Inventor: James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 846 days.

(21) Appl. No.: 12/390,988

(22) Filed: Feb. 23, 2009

(65) Prior Publication Data
US 2010/0214577 A1 Aug. 26, 2010

(51) Int. Cl.
*G06K 1/00* (2006.01)
*G06F 15/00* (2006.01)
*H04N 1/46* (2006.01)

(52) U.S. Cl. ......... 358/1.9; 358/518; 358/521; 358/523; 358/539

(58) Field of Classification Search .............. 358/1.9, 358/518–523
See application file for complete search history.

(56) References Cited

U.S. PATENT DOCUMENTS

| | | | | |
|---|---|---|---|---|
| 5,459,486 A * | 10/1995 | Iverson et al. | ............... | 345/593 |
| 6,034,667 A | 3/2000 | Barrett | | |
| 6,064,493 A * | 5/2000 | Neff | ............... | 358/1.9 |
| 6,256,104 B1 * | 7/2001 | Rumph et al. | ............... | 358/1.15 |
| 6,342,896 B1 * | 1/2002 | Shetter et al. | ............... | 345/589 |
| 2003/0151612 A1 * | 8/2003 | Marino | ............... | 345/600 |
| 2004/0085563 A1 * | 5/2004 | Nishimura | ............... | 358/1.13 |
| 2004/0150842 A1 | 8/2004 | Sanger et al. | | |
| 2005/0041038 A1 * | 2/2005 | Sanger | ............... | 345/612 |
| 2007/0031053 A1 * | 2/2007 | Chiang et al. | ............... | 382/244 |
| 2008/0062480 A1 * | 3/2008 | Iizuka et al. | ............... | 358/518 |

FOREIGN PATENT DOCUMENTS

| | | |
|---|---|---|
| JP | 04-331165 | 11/1992 |
| JP | 06-218989 | 8/1994 |
| JP | 2002-236566 | 8/1994 |
| JP | 09-022279 | 1/1997 |
| JP | 11-151836 | 6/1999 |
| JP | 2000-198239 | 7/2000 |
| JP | 2002-073297 | 3/2002 |
| JP | 2002-236566 | 8/2002 |
| JP | 2003-162713 | 6/2003 |
| JP | 2004-178126 | 6/2004 |
| JP | 2005-059363 | 3/2005 |
| JP | 2006-333066 | 12/2006 |

OTHER PUBLICATIONS

Notice of Allowance for U.S. Appl. No. 12/390,909 mailed Oct. 14, 2011.

* cited by examiner

*Primary Examiner* — Richard Zhu
(74) *Attorney, Agent, or Firm* — Michael Blaine Brooks, PC; Pejman Yedidsion; David Ripma

(57) ABSTRACT

Machine-enabled methods of, and devices and systems for, encoding color bitmap data as indexed red-green-blue (RGB) data for printing and optional multi-functional peripheral (MFP) device raster image processor (RIP) bypass.

33 Claims, 12 Drawing Sheets

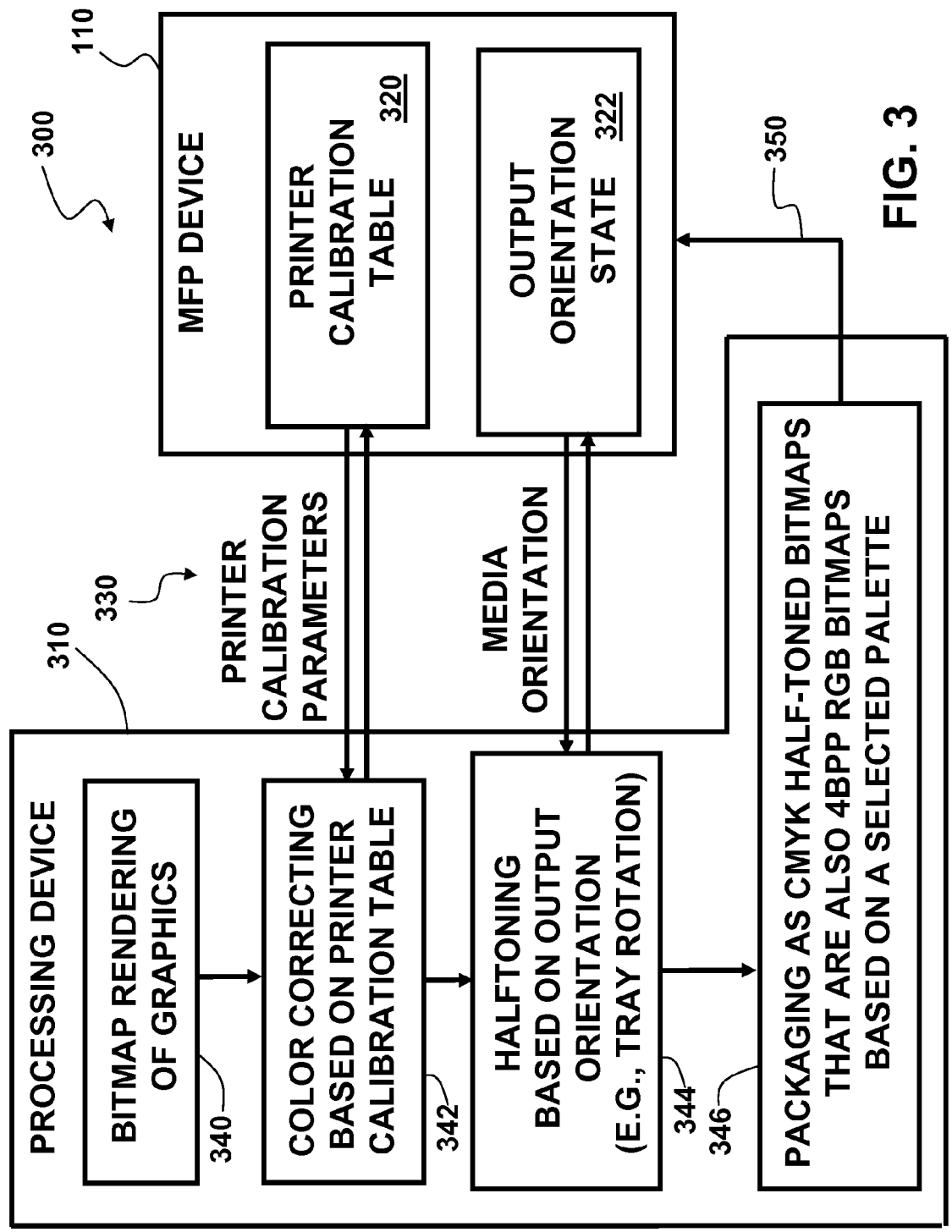

| # | BIN | RGB VALUE | COLOR NAME |
|---|---|---|---|
| 0 | 0000 | 0,0,0 | WHITE |
| 1 | 0001 | 255,255,255 | BLACK (K) |
| 2 | 0010 | 255,255,0 | YELLOW |
| 3 | 0011 | 255,255,255 | BLACK (K) |
| 4 | 0100 | 255,0,255 | MAGENTA |
| 5 | 0101 | 255,255,255 | BLACK (K) |
| 6 | 0110 | 255,0,0 | RED (Y+M) |
| 7 | 0111 | 255,255,255 | BLACK (K) |
| 8 | 1000 | 0,255,255 | CYAN |
| 9 | 1001 | 255,255,255 | BLACK (K) |
| 10 | 1010 | 0,255,0 | GREEN(C+Y) |
| 11 | 1011 | 255,255,255 | BLACK (K) |
| 12 | 1100 | 0,0,255 | BLUE (C+M) |
| 13 | 1101 | 255,255,255 | BLACK (K) |
| 14 | 1110 | 255,255,255 | BLACK (K) |
| 15 | 1111 | 255,255,255 | BLACK (K) |

FIG. 5

| # | BIN | RGB VALUE | COLOR NAME |
|---|------|-------------|-------------|
| 0 | 0000 | 0,0,0 | WHITE |
| 1 | 0001 | 0,255,255 | CYAN |
| 2 | 0010 | 255,0,255 | MAGENTA |
| 3 | 0011 | 0,0,255 | BLUE (C+M) |
| 4 | 0100 | 255,255,0 | YELLOW |
| 5 | 0101 | 0,255,0 | GREEN(C+Y) |
| 6 | 0110 | 255,0,0 | RED (Y+M) |
| 7 | 0111 | 255,255,255 | BLACK (K) |
| 8 | 1000 | 255,255,255 | BLACK (K) |
| 9 | 1001 | 255,255,255 | BLACK (K) |
| 10 | 1010 | 255,255,255 | BLACK (K) |
| 11 | 1011 | 255,255,255 | BLACK (K) |
| 12 | 1100 | 255,255,255 | BLACK (K) |
| 13 | 1101 | 255,255,255 | BLACK (K) |
| 14 | 1110 | 255,255,255 | BLACK (K) |
| 15 | 1111 | 255,255,255 | BLACK (K) |

FIG. 9

| # | BIN | RGB VALUE | COLOR NAME |
|---|---|---|---|
| 0 | 0000 | 0,0,0 | WHITE |
| 1 | 0000001 | 255,255,255 | BLACK (K) |
| 12 | 00001100 | 255,255,0 | YELLOW |
| ... | ... | ... | ... |
| 48 | 00110000 | 255,0,255 | MAGENTA |
| ... | ... | ... | ... |
| 60 | 00111100 | 255,0,0 | RED (Y+M) |
| ... | ... | ... | ... |
| 192 | 11000000 | 0,255,255 | CYAN |
| ... | ... | ... | ... |
| 204 | 11001100 | 0,255,0 | GREEN(C+Y) |
| ... | ... | ... | ... |
| 240 | 11110000 | 0,0,255 | BLUE (C+M) |
| ... | ... | ... | ... |
| 255 | 11111111 | 255,255,255 | BLACK (K) |

FIG. 11

| # | BIN | RGB VALUE | COLOR NAME |
|---|---|---|---|
| 0 | 0000 | 0,0,0 | WHITE |
| 1 | 0001 | 17,17,17 | GRAY |
| 2 | 0010 | 34,34,34 | GRAY |
| 3 | 0011 | 51,51,51 | GRAY |
| 4 | 0100 | 68,68,68 | GRAY |
| 5 | 0101 | 85,85,85 | GRAY |
| 6 | 0110 | 102,102,102 | GRAY |
| 7 | 0111 | 119,119,119 | GRAY |
| 8 | 1000 | 136,136,136 | GRAY |
| 9 | 1001 | 153,153,153 | GRAY |
| 10 | 1010 | 170,170,170 | GRAY |
| 11 | 1011 | 187,187,187 | GRAY |
| 12 | 1100 | 204,204,204 | GRAY |
| 13 | 1101 | 221,221,221 | GRAY |
| 14 | 1110 | 238,238,238 | GRAY |
| 15 | 1111 | 255,255,255 | BLACK (K) |

FIG. 12

ENCODING OF NON-INDEXED DATA FOR PRINTING USING INDEXED RGB

CROSS-REFERENCE TO RELATED APPLICATIONS

This application is related to U.S. Pat. No. 8,134,573 issued Mar. 13, 2012, entitled "ENCODING CMYK DATA FOR DISPLAY USING INDEXED RGB," by Uoc Huu Nguyen and James E. Owen, which is hereby incorporated herein by reference in its entirety for all purposes.

FIELD OF ENDEAVOR

The present invention, in its several embodiments, relates to methods, devices and systems for encoding color data, e.g., cyan-magenta-yellow-black (CMYK) data, using indexed red-green-blue (RGB) and particularly using combined color bitmaps or interleaved data to form directly the index and providing an option to bypass the raster image processor (RIP) of a multi-functional peripheral (MFP) device.

BACKGROUND

Vector graphics are digital images expressed via a sequence of commands or mathematical statements, i.e., vector graphics statements, that place lines and shapes in a given two-dimensional or three-dimensional space. Compared to a simple bitmap, instead of containing a bit in the file for each bit of a line drawing, a vector graphic file describes a series of points to be connected. A vector image may be converted into a raster graphics image, which maps bits directly to a display space or a bitmap. The vector image may be converted to a raster image file prior to its display so that it can be ported between systems. Raster graphics are digital images created or captured as a set of samples of a given space. A raster is a grid of x and y coordinates on a display space. A raster image file identifies which of these coordinates to illuminate in monochrome or color values. The raster file is sometimes referred to as a bitmap because it contains information that is directly mapped to the display grid. A raster image processor (RIP) is a hardware device or a combination hardware/software device that converts images described in the form of vector graphics statements into raster graphics images or bitmaps that may be printed.

A printer description language (PDL), such as Postscript, PCL5, PCL XL (also called PCL6), comprises commands to render graphics produced by applications i.e., computer-readable instructions. In typical setups, the applications use the operating system (OS) graphics to display graphical items, and when the user requests a printout, the application gives similar OS graphics to a printer oriented display. The OS passes these graphics calls to a driver that translates them into a PDL. PCL XL is a page description language that is part of PCL languages and is similar to Microsoft's graphics device interface (GDI).

Extensible Markup Language (XML) is a general-purpose markup language for communicating structure data whereby users may define their own tags. XML Paper Specification (XPS) is a specification for a page description language and a fixed-document format. Printer Control Languages (PCL5 and PCL6) and XPS support graphic data expressed as vectors, text and contone, i.e., multi-level intensity, red-green-blue (RGB) and, in the case of XPS, contone cyan-magenta-yellow-black (CMYK). Other PDLs support other color spaces. The ink that may be used may include dilute colorants. For example, four-ink printing may be extended to six-ink printing, e.g., a light cyan (lt.cyan) and a light magenta (lt.magenta) may be added to four-ink printing: cyan-magenta-yellow-black-lt.cyan-lt.magenta-black. An exemplary form of seven-ink printing adds RGB to CMYK. Color dyes may be selected for strong, pure color as high-chroma primaries, such as orange and green. For example, the use of CMYK with PANTONE™ inks, and particularly PANTONE™ Hexachrome green and orange, may also provide for an alternative six-ink printing.

A bitmap defines a display space and color for each pixel. The colors may be defined in different spaces, such as RGB, CMYK, and LAB. Each color may be defined as some level in a range expressed by a level definable according to bit size, e.g., 1-bit, 2-bit, 8-bit, 16-bit, and 32-bit. The arrangement of the pixels may be planar, e.g., a grayscale-like planar scheme for each of red, green and blue planes, which can be combined to generate a multiple color bitmap. The arrangement of pixels may be interleaved, where, for example in a single array, each pixel contains information pertaining to the multiple colors of the arrangement, e.g., an R level value followed by a G level of value followed by a B level of value. For the contone CMYK, the planar arrangement may comprise four grayscale-like planes. The interleaved arrangement may have a pixel defined by four constituent levels, e.g., a C level value followed by a M level value, followed by a Y level value followed by a K level value.

A raster driver is a program that controls the raster firmware device of a printer. A raster driver converts the more general input/output instructions of the processing device to messages that the raster image processor may process and may apply color conversions and halftoning. A PCL5/XP RIP may not recognize processing graphics data already halftoned as rasterized by a raster external to the multifunction peripheral (MFP) device.

SUMMARY

The invention, in its several embodiments may be illustrated as a process executed via a machine, device system that includes an MFP and a processing device, or within a processing module of a processing device, such as a device driver loaded on a host computer. For example, an exemplary embodiment includes a computer-implemented method of encoding bitmap data as indexed red-green-blue (RGB) data for printing comprising the steps, not necessarily in the following order of: (a) selecting a pixel array, e.g., planar data or interleaved data, comprising a plurality of pixels, each pixel comprising an ordered set of bits representing a level of at least one color, e.g., a level of at least one color of RGB data or an RGB color space, or a level of at least one color of non-RGB data or a non-RGB color space; (b) selecting, in a physical processing device, an indexed RGB palette; and (c) applying, for each pixel of the pixel array, an index value equivalent of the ordered set of bits to determine the color of the pixel according to the selected indexed RGB palette. In some computer-implemented method embodiments, the selected indexed RGB palette is indexed for sixteen colors and, in other embodiments, the selected indexed RGB palette is indexed for 256 colors. Some embodiments of the computer-implemented method may further include the steps of outputting the pixel array according to the selected indexed RGB palette and outputting a raster image processing bypass indicator. Some embodiments of the computer-implemented method may further include the step of combining the pixel array with an output of the raster image processing. Some embodiments of the computer-implemented method may further comprise the steps of outputting the pixel array according to the selected indexed RGB palette, outputting the selected palette, and determining a raster image processing bypass based on the output selected palette.

The computer-implemented method may further comprise, prior to the step of selecting a pixel array, providing a set of member pixel arrays comprising: a first pixel array representing, via a state for each pixel of the first pixel array, a first primary color bitmap; a second pixel array representing, via a state for each pixel of the second pixel array, a second primary color bitmap; a third pixel array representing, via a state for each pixel of the third pixel array, a third primary color bitmap; and a fourth binary pixel array representing, via a state for each pixel of the fourth pixel array, a black bitmap; and then combining, the set of member pixel arrays by associating pixels across a plurality of member pixel arrays according to a shared relative location in two-space to form a combined pixel array wherein each pixel of the combined pixel array comprises an ordered set of bits representing the respective states of each of the associated pixels across the member pixel arrays. In some embodiments, the least one of the first pixel array, second pixel array, third pixel array and fourth pixel array comprise an array comprising 1-bit pixels. In some embodiments of the computer-implemented method, at least one of the first pixel array, second pixel array, third pixel array and fourth pixel array comprise an array comprising 2-bit pixels. In some embodiments of the computer-implemented method, the generating step further comprises halftoning the set of member pixel arrays. Some embodiments of the computer-implemented method may further comprise the step of inputting color calibration data of a printing device wherein the process further comprises generating the set of member pixel arrays based on the color calibration data. In some embodiments of the computer-implemented method, the process further comprises halftoning the set of member pixel arrays based on the color calibration data and a print output orientation.

Other exemplary embodiments include processing devices configured to encode bitmap data as indexed red-green-blue (RGB) data for printing. An exemplary processing device may comprise a processor and accessible memory, wherein the processor is configured to: (a) input a pixel array, e.g., planar data or interleaved data, comprising a plurality of pixels, each pixel comprising an ordered set of bits representing a level of at least one color, e.g. a level of at least one color of RGB data or an RGB color space, or a level of at least one color of non-RGB data or a non-RGB color space; (b) reference an indexed RGB palette; and (c) apply, for each pixel of the pixel array, an index value equivalent of the ordered set of bits to determine the color of the pixel according to the indexed RGB palette. In some processing device embodiments, the indexed RGB palette is indexed for sixteen colors and for other embodiments, the indexed RGB palette is indexed for 256 colors. Some processing device embodiments may be further configured to execute instructions to: output the pixel array according to the indexed RGB palette and output a raster image processing bypass indicator and some may be further configured to execute instructions to combine the pixel array with output data of a raster image processing. Some processing device embodiments may have the processor further configured to execute instructions to: output the pixel array according to the indexed RGB palette and output the indexed RGB palette wherein the indexed RGB palette comprises a quantity of indices for black; wherein the quantity as a value is a raster image processing bypass indicator. Some processing device embodiments further comprise a receiving portion adapted to receive color calibration data of a printing device and the processor is further configured to generate, from graphics data and based on received color calibration data, the set of member pixel arrays. In some processing device embodiments, the processor is further configured to execute instructions to halftone the set of member pixel arrays based on the color calibration data.

Some of the processing device embodiments may further be configured to execute instructions to: input, from graphics data, the set of member pixel arrays, the set of members comprising: a first pixel array representing, via a state for each pixel of the first pixel array, a first primary color bitmap; a second pixel array representing, via a state for each pixel of the second pixel array, a second primary color bitmap; a third pixel array representing, via a state for each pixel of the third pixel array, a third primary color bitmap; and a fourth binary pixel array representing, via a state for each pixel of the fourth pixel array, a black bitmap; and combine a set of member pixel arrays by associating pixels across the member pixel arrays according to a shared relative location in two-space to form a combined pixel array wherein each pixel of the combined pixel array comprises an ordered set of bits representing the respective states of each of the associated pixels across the member pixel arrays. In some of the processing device embodiments, at least one of the first pixel array, second pixel array, third pixel array and fourth pixel array comprise an array comprising 1-bit pixels. In some of the processing device embodiments, at least one of the first pixel array, second pixel array, third pixel array and fourth pixel array comprise an array comprising 2-bit pixels.

Some of the embodiments of the invention include system embodiments where the system is configured to encode color bitmap data as indexed red-green-blue (RGB) data and bypass raster image processing for printing, the system comprising: (1) a processing device comprising: a processor and accessible memory, where the processor is configured to execute instructions to: (a) input a pixel array, e.g., planar data or interleaved data, comprising a plurality of pixels, e.g., planar data or interleaved data, each pixel comprising an ordered set of bits representing a level of at least one color, e.g., a level of at least one color of RGB data or an RGB color space, or a level of at least one color of non-RGB data or a non-RGB color space; (b) reference an indexed RGB palette; (c) apply, for each pixel of the pixel array, an index value equivalent of the ordered set of bits to determine the color of the pixel according to the indexed RGB palette; and (d) output the pixel array according to the indexed RGB palette; and (2) a multi-function peripheral (MFP) device comprising: a printer; a raster image processor configured to output rasterized data to the printer; and a raster image processor bypass circuit configured to send the pixel array according, to the indexed RGB palette, to the printer. In some of the system embodiments, the indexed RGB palette of the processing device is indexed for sixteen colors and in other embodiments 256 colors. Some of the system embodiments have a processor of the processing device that is further configured to execute instructions to: output the pixel array according to the indexed RGB palette and output a raster image processing bypass indicator and wherein the MFP is configured to effect the means for bypassing the raster image processor and sending the pixel array according to the indexed RGB palette to the printer based on the raster image processing bypass indicator. Some of the system embodiments have a processor of the processing device that is further configured to execute instructions to combine the pixel array with output data of a raster image processing and wherein the MFP is configured to effect the means for bypassing the raster image processor and sending the pixel array, according to the indexed RGB palette, to the printer based on the raster image processing bypass indicator. The MFP further comprises means for combining the pixel array with the output data of a raster image processing. Some of the system embodiments have a processor of the processing device that is further configured to execute instructions to: output the pixel array according to the indexed RGB palette and output the indexed RGB palette wherein the indexed RGB palette comprises a quantity of indices for black; wherein the quantity as a value is a raster image processing bypass indicator and wherein the MFP is configured to bypass the raster image processor and send the pixel array according to the indexed RGB palette to the printer based on the raster image processing bypass indicator. Some embodiments of the system have the processing device further comprising a receiving portion adapted to receive color calibration data of a printing device and the processor is further configured to generate, from graphics data and based on received color calibration data, the set of member pixel arrays. Some of the system embodiments have a processor of the processing device that is further configured to execute instructions to halftone the set of member pixel arrays based on the color calibration data.

Some embodiments of the system have the processor of the processing device further configured to: input from graphics data, the set of member pixel arrays, the set of members comprising: a first pixel array representing, via a state for each pixel of the first pixel array, a first primary color bitmap; a second pixel array representing, via a state for each pixel of the second pixel array, a second primary color bitmap; a third pixel array representing, via a state for each pixel of the third pixel array, a third primary color bitmap; and a fourth binary pixel array representing, via a state for each pixel of the fourth pixel array, a black bitmap; and combine a set of member pixel arrays by associating pixels across the member pixel arrays according to a shared relative location in two-space to form a combined pixel array wherein each pixel of the combined pixel array comprises an ordered set of bits representing the respective states of each of the associated pixels across the member pixel arrays. In some of the system embodiments, the at least one of the first pixel array, second pixel array, third pixel array and fourth pixel array of the processing device comprise an array comprising 1-bit pixels. In some of the system embodiments, the at least one of the first pixel array, second pixel array, third pixel array and fourth pixel array of the processing device comprise an array comprising 2-bit pixels.

BRIEF DESCRIPTION OF THE DRAWINGS

Embodiments of the present invention are illustrated by way of example and not limitation in the figures of the accompanying drawings, and in which:

FIG. 3 illustrates a top level functional block diagram of an exemplary processing device in communication with an exemplary MFP device;

FIG. 5 is a tabular depiction of an exemplary palette expressed as 4-bpp indexed RGB;

FIG. 9 is a tabular depiction of an exemplary palette expressed as 4-bpp indexed RGB;

FIG. 11 is a tabular depiction of an exemplary palette expressed as 8-bpp indexed RGB; and FIG. 12 is a tabular depiction of an exemplary palette expressed as 4-bpp indexed RGB.

DETAILED DESCRIPTION

Figure 1:
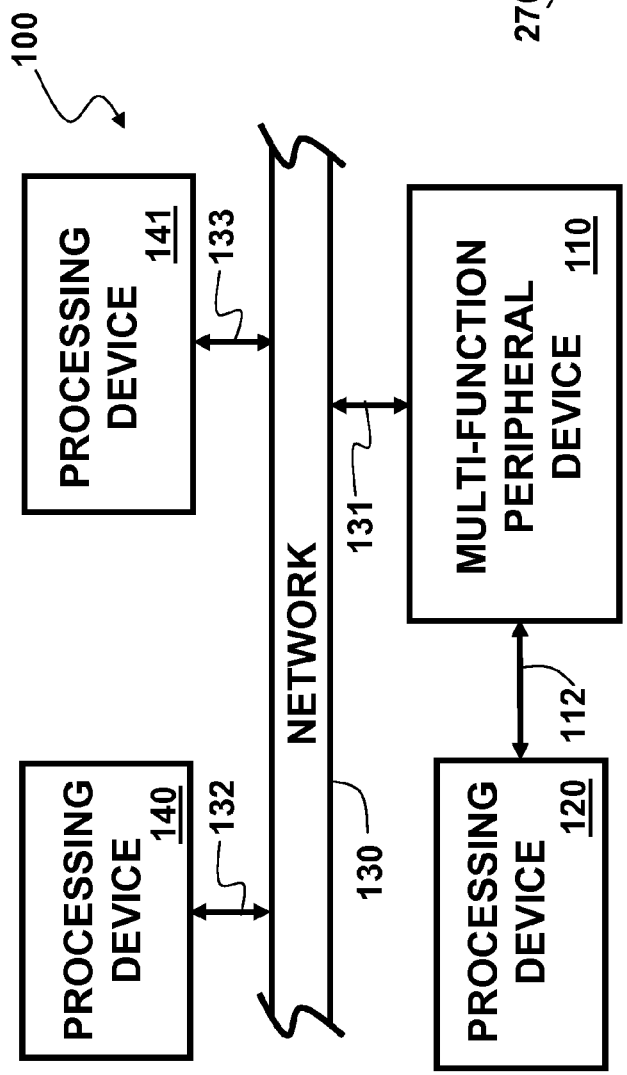
FIG. 1 illustrates, at a top level an exemplary system comprising a plurality of processing devices in communication with a multi-function peripheral (MFP) device.

FIG. 1 illustrates an exemplary system embodiment 100 of the present invention where a printing device or a multi-functional peripheral (MFP) device 110 may be in direct communication 112 with a processing device 120, such as a computer hosting one or more drivers applicable to the printing device or multi-functional peripheral device 110. In addition, via a network 130 and a network link 131-133, the printing device or a multi-functional peripheral device 110 may be in communication with one or more processing devices 140, 141, such as one or more computers that may each host one or more drivers applicable to the printing device or the MFP device 110.

Figure 2B:
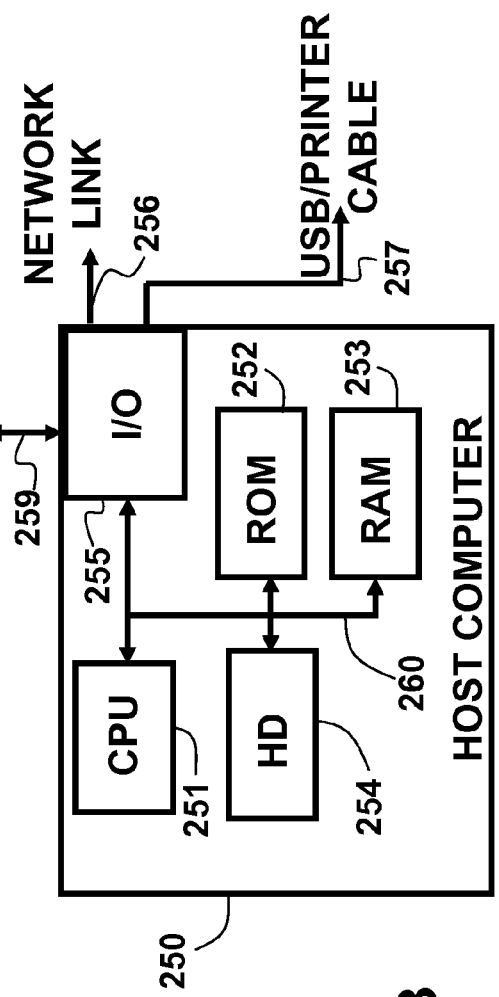
FIG. 2B illustrates a top level functional block diagram of an exemplary host computer that may host a driver embodiment of the present invention.
Figure 2A:
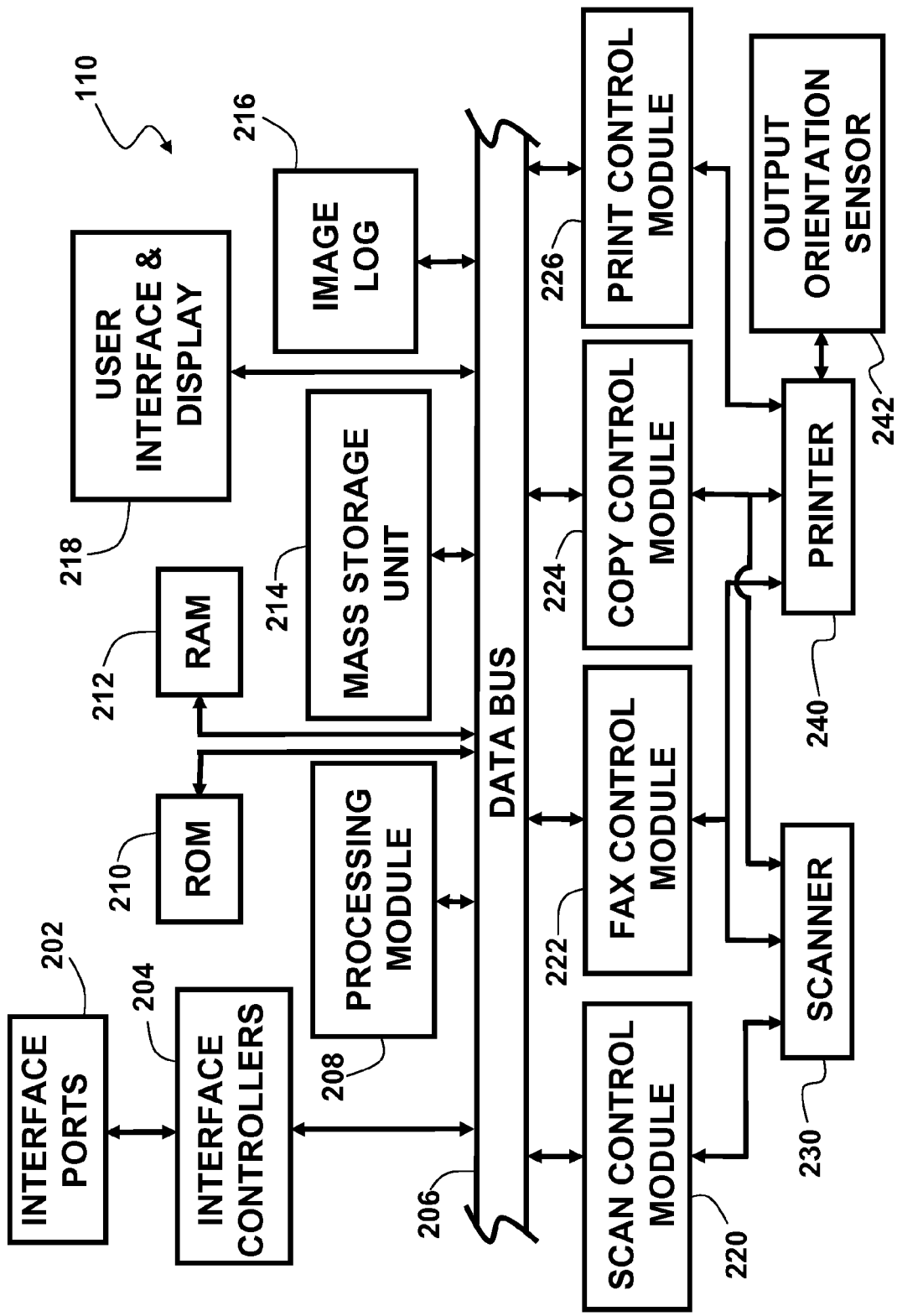
FIG. 2A illustrates a top level functional block diagram of an exemplary MFP device.

The exemplary printing device or MFP device 110 of FIG. 1 may be illustrated in greater exemplary functional detail in FIG. 2A. Interface ports 202 may be present to connect a printer cable, a network link, or an external wireless module. The interface ports 202 may be serviced by one or more interface controllers 204 that function to direct communications and/or condition signals between the respective interface port 202 and one or more modules of the MFP device 110 which may be in common communication via a data bus 206. The MFP device 110 may include one or more processing modules 208 that may draw data from read-only memory (ROM) 210 and exchange data with random access memory (RAM) 212 and may store files having sizes greater than the RAM 212 capacity in one or more mass storage units 214. The MFP device 110 may maintain a log of its images 216 and have a user display and interface 218. The image log 216 may be a separate module or distributed, for example, with a portion executed via the processing module 208 that may access parameters, files, and/or indices that may be stored in ROM 210, RAM 212, a mass storage unit 214 or in combination thereof. The MFP device 110 may include as individual or separate modules a scan control module 220, a facsimile (FAX) control module 222, and a copy control module 224 where each module may service the scanner 230 to direct communications and/or condition signals between the scanner 230 and one or more modules of the MFP device 110, for example, via the data bus 206. The MFP device 110 may include as individual or separate modules the FAX control module 222, the copy control module 224 and a print control module 226 where each module may service the printer 240 to direct communications and/or condition signals between the printer 240 and the one or more modules of the MFP device 110, for example, via the data bus 206. The exemplary MFP device 110 may store a calibration table in ROM 210, RAM 212, a mass storage unit 214 or in combination thereof and accordingly, the calibration table may be accessed by the print control module 226 and/or a processing module 208 and made available to devices external to the MFP device 110 via one or more interface ports 202. The exemplary MFP device 110 may have notice, for example, due to a user input via the user interface 218 or sensed by an output orientation sensor 242 of the printer 240 and may be communicated via the print control module 226 to devices external to the MFP device 110 via one or more interface ports 202. FIG. 2B illustrates a top level functional block diagram of a processing device that is an exemplary host computer 250 that may host a driver embodiment of the present invention that, via an input/output interface 255 may interface 259 with the exemplary MFP of FIG. 2A via a wireless or wired network link 256 or a parallel, serial, or universal serial bus (USB) cable 257. The user interface 270 may include tactile input via keyboard, mouse and/or touch screen and/or audio input via a microphone. The user interface 270 may provide output to the user via a display, e.g., a graphical user interfaces (GUI), and/or provide audio output to the user via one or more speakers, headphones or ear buds. The host computer 250 may further comprise a central processing unit (CPU) 251, read only memory (ROM) 252, random access memory (RAM) 253 and a mass storage unit 254, such as a hard disk drive. Two or more elements of the host computer 250 may be in communication via a data bus 260. The general accessing of data, processing of data and communication and display of data may be handled at the CPU level of the host computer 250 by an operating system such as MICROSOFT™ WINDOWS™.

Illustrated in FIG. 3 is a system 300 that includes a processing device 310 and an MFP device 110. The MFP device 110 is shown in simplified form illustrating the presence of a printer calibration table 320 and output orientation state 322 of the print medium or substrate. The processing device 310 is shown having one or more communication paths 330 whereby the processing device 310 may query or access contents of the printer calibration table 320 and similarly may query or access the orientation state 322 of the output medium. For an MFP having several trays, this may be an indication of the tray selected in a tray rotation. Also illustrated in FIG. 3 in a functional step is the bitmap rendering (step 340) of the graphics that may be designated for printing by the MFP device 110. The processing device 310 may correct the color of the bitmap renderings (step 342) based on content of the printer calibration table. The bitmap renderings may be halftoned (step 344) and the halftoning may be based on the output orientation state of the print medium or substrate and the halftoning may be effected via raster lines or in matrices of blocks of pixels. Each pixel, depending on the resulting color corrections and halftoning, may have a color that may be characterized by one or more bits according to the cyan-magenta-yellow-black (CMYK) scheme. The packaging step (step 346) concatenates the individual halftoned color bitmaps or planes and, for each concatenated pixel, maps the result via a selected palette into the red-green-blue (RGB) scheme. For example, overlaying four single-bit (1-bit) color CMYK bitmaps determines, pixel-by-pixel, the color of the resulting four-bit (4-bit) pixel in CMYK. The result may then be mapped into a 4-bit RGB bitmap according to a selected bitmap. The resulting 4-bit RGB bitmap may then be sent to the MFP device 110 for further processing, if needed, and printing. Accordingly, halftoned CMYK data that may otherwise be unsupported by the target MFP RIP may be converted, by the teachings of the exemplary embodiment of the invention, into indexed RGB data supported by the target MFP RIP that may be expressed in a standard page description language (PDL). The exemplary steps of the processing device 310 may be provided as one or more device drivers that may be executed for a selected MFP 110 and communicated (step 350) via a printer cable, such as a parallel cable, a serial cable, a universal serial bus (USB) or a network link.

Figure 4:
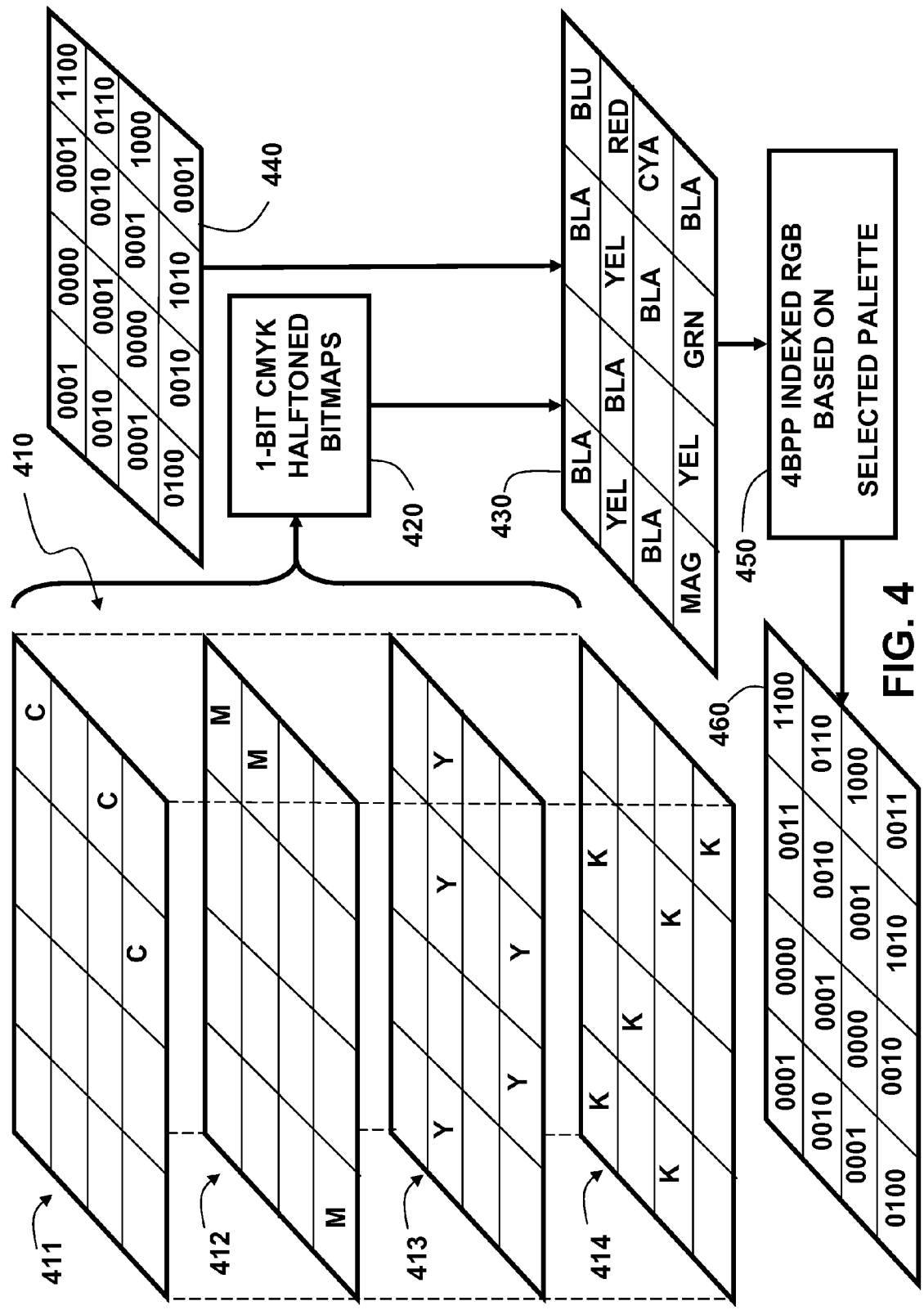
FIG. 4 is a graphical depiction of an exemplary conversion from 1-bit CMYK halftoned bitmaps to 4-bpp indexed RGB.

FIG. 4 depicts graphically the mapping of a portion of an image which in this example is a four-by-four set of 4-bit pixel depth 410 where each bit is represented in a color plane or bitmap level of depth, i.e., single bit-per-pixel (1-bpp) halftoned CMYK data. The top exemplary plane 411 represents a halftoned 1-bit cyan, C, bitmap. The next exemplary plane 412 below the cyan bitmap represents a halftoned 1-bit magenta, M, bitmap. The next exemplary plane 413 below the magenta bitmap represents a halftoned 1-bit yellow, Y, bitmap. The bottom exemplary plane 414 represents the halftoned 1-bit black, K, bitmap. These four planes 411-414, when aligned, express as 1-bit planes a 4-bit bitmap. Applying the CMYK scheme 420 to these 1-bit planes 411-414 of a bitmap, the resulting 4-bit bitmap 430 may be expressed in exemplary fashion as black (BLA←K), blue (BLU←C+M), yellow (YEL←Y), red (RED←M+Y), cyan (CYA←C), magenta (MAG←M), and green (GRN←C+Y). Two-space as it is used here includes a geometrically expressed line of pixels such as m×1 as well as a block, rectangle or matrix of pixels such as m×n. Rather than represent the color information for a bitmap in the four planes 411-414, the information may be represented in an interleaved bitmap 440 where in this example a 1-bit level of a color component may be expressed by a "1" and in the order of the CMYK scheme. That is, the colors may be expressed in exemplary fashion as black (BLA←0001), blue (BLU←1100), yellow (YEL←0010), red (RED←0110), cyan (CYA←1000), magenta (MAG←0100), and green (GRN←1010). Whether originating from an expression in planes 411-414 or as interleaved colors 440 of non-RGB data or non-RGB color spaces, or in other embodiments as RGB data or RGB color spaces, the 4-bits per pixel (bpp) representation 430, in this example, may be mapped 450, based on a selected palette and according to 4 bbp indexed RGB 460.

File formats like TIF and JPG store a 24 bit RGB value for each of the millions of image pixels. But GIF files only store a 4 or 8 bit index at each pixel, so that the image data is ⅙ or ⅓ the size of 24 bits. Indexed color is limited to 256 colors, which can be any 256 from the set of 16.7 million 24 bit colors. Each color used is a 24 bit RGB value. Each such image file contains its own color palette, which is a list of the selected 256 colors, or 16 colors in a smaller palette. Images are called indexed color because the actual image color data for each pixel is the index into this palette. Each pixel's data is a number that specifies one of the palette colors, like maybe "color number 15", where 15 is the index into the palette, the fifth color in the palette list of colors. Reference must be made to the palette to determine the color is being indexed. The palette may be stored in the file with the image.

The index may be a 4-bit value that yields 16 colors or an 8-bit value that yields 256 colors for each pixel. The first RGB color in the table is index 0, the second RGB color is index 1, and so on. While an 8-bit number can only contain a numerical value of 0 to 255, i.e., only 256 colors can be in the palette of possible colors, the use of indexed color economized storage in that eight bits may be used for an indexed color of 256 colors that requires considerably less storage space or channel capacity than 24 bits for every pixel. The size of most graphics files can be limited to use 16 colors, which requires no more than 4-bit indexes. The indexed file also contains the palette too, which is the table of the selected 24 bit colors, or 3 bytes of RGB overhead for each color in the palette (768 bytes for 256 colors). Indexed files have 24 bits stored for each palette color, but not for each pixel. Each pixel stores either a 4-bit or an 8-bit index to specify which palette color is used. Four bits permits a table or palette having an index of sixteen entries.

FIG. 5 illustrates in tabular form an exemplary palette of sixteen color entries where each index or color value has a corresponding binary value that corresponds to a 4-bit RGB value. A mapping from the CMYK scheme to the 4-bit RGB representation may be accomplished via the color equivalencies illustrated in the color name column of FIG. 5. The exemplary palette for the bitmaps may comprise eight primary colors and eight identical blacks. In reviewing the tabular representation and particularly the 4-bit binary column, one may note that when the lowest or rightmost position is set to "1," the indexed value is black. One may also note that when the lowest or rightmost position is set to "0," white or another color may be indexed. For example, the highest or leftmost position may be used to represent cyan when set to "1" or "on," the second highest position may be used to represent magenta and the third highest position may be used to represent yellow. One may also note the color combinations produced by positioning two "on" values may be used to index the colors red, green and blue. Embodiments of the present invention include those that readily scale up including two bit-per-pixel (2-bpp) halftoned data where the color, e.g., each color plane of FIG. 4, may have three levels of intensity/pigmentation. In place of an indexed 4-bpp RGB conversion, an 8-bpp RGB conversion is applied that may be based on a palette expanded over that of FIG. 5 comprising 256 color entries where the entries are selected to provide two levels each of cyan, magenta, yellow, and black.

Figure 6:
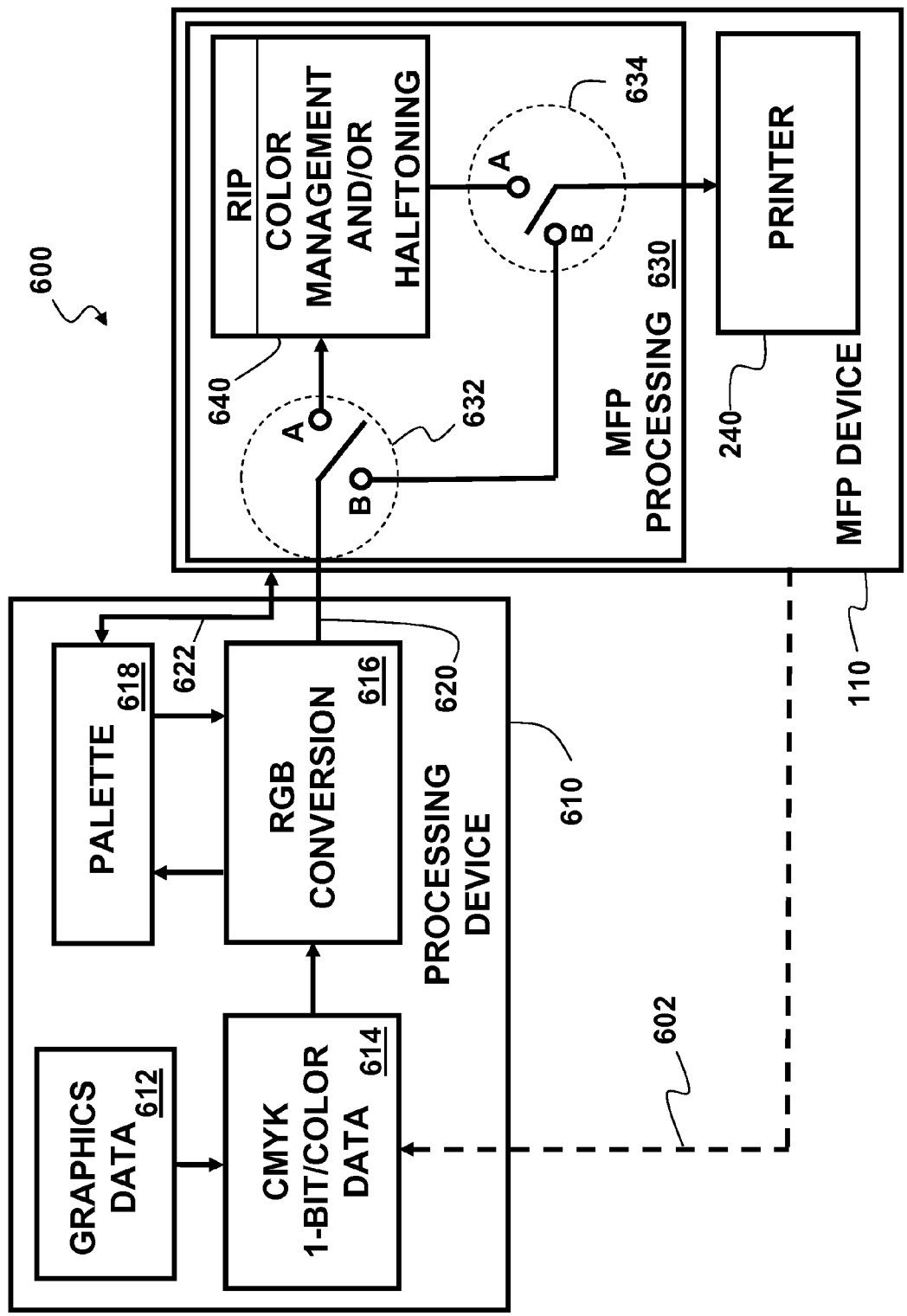
FIG. 6 illustrates a top level functional block diagram of an exemplary device in communication with an exemplary MFP device.

FIG. 6 illustrates a system 600 where the MFP device 110 may send color calibration parameters and output tray orientation or other print media orientation state information 602 to the processing device 610. The processing device operates on graphics data 612 by rasterizing the data in exemplary formats, such as lines or blocks, i.e., bands or rectangles that may then be halftoned into 1-bit CMYK data. The rasterizing, particularly the halftoning, at this stage (stage 614) may be based on the color calibrations parameters and/or the MFP device output tray orientation 602. The exemplary 1-bit CMYK data of the exemplary stage of rasterizing with halftoning (stage 614) may then be converted at the RGB conversion stage (stage 616) based on the selected palette 618 as exemplified in FIG. 5. The processing device 610 may send a print job 620, for example, in a page description language (PDL) to the MFP device 110 that includes a flag 622 that may be included with the PDL of the print job 620. The flag 622 may be implemented as printer job language (PJL) command. The flag 622, that is, the need for a bypass, may also, or instead, be derived by the frequency of black entries in the selected palette where the frequency, e.g., eight in the exemplary palette of FIG. 5, may be indicative of the need for a processing bypass. The MFP device 110 of FIG. 6 is illustrated having MFP processing 630 that may include raster image processor (RIP) hardware or hardware/software, or firmware, that may convert images described in vector graphic statements into raster graphics or bitmaps. The RIP 640 may output the bitmaps based on a color management module and/or halftoning rules. The flag 622 may be read by the MFP processing 630 of the MFP device 110 so that the print job may be sent to the output of the RIP for printing via the printer 240 of the MFP device 110. FIG. 6 illustrates this exemplary bypass with a pair of switches 632, 634 where the switches would be in state "A" when the selected palette is not used. When the selected palette is used, that is, if the data being sent to the MFP device 110 was graphics data that had undergone 4-bit RGB conversion from CMYK 1-bit color data according to a selected palette, then the exemplary MFP processing 630 places the switches in state "B" and thereby bypasses color management operations and/or halftoning steps and rasterizing. Accordingly, in the example of FIG. 6, the halftoned CMYK 1-bit data is mapped as 4-bit RGB data that may be routed to the output of the RIP firmware of the printer 240 of the MFP device 110. In other embodiments, rather than the input to the MFP being in PDL or a compressed PDL, a raster driver may output in PCLXI or XPS.

Figure 7:
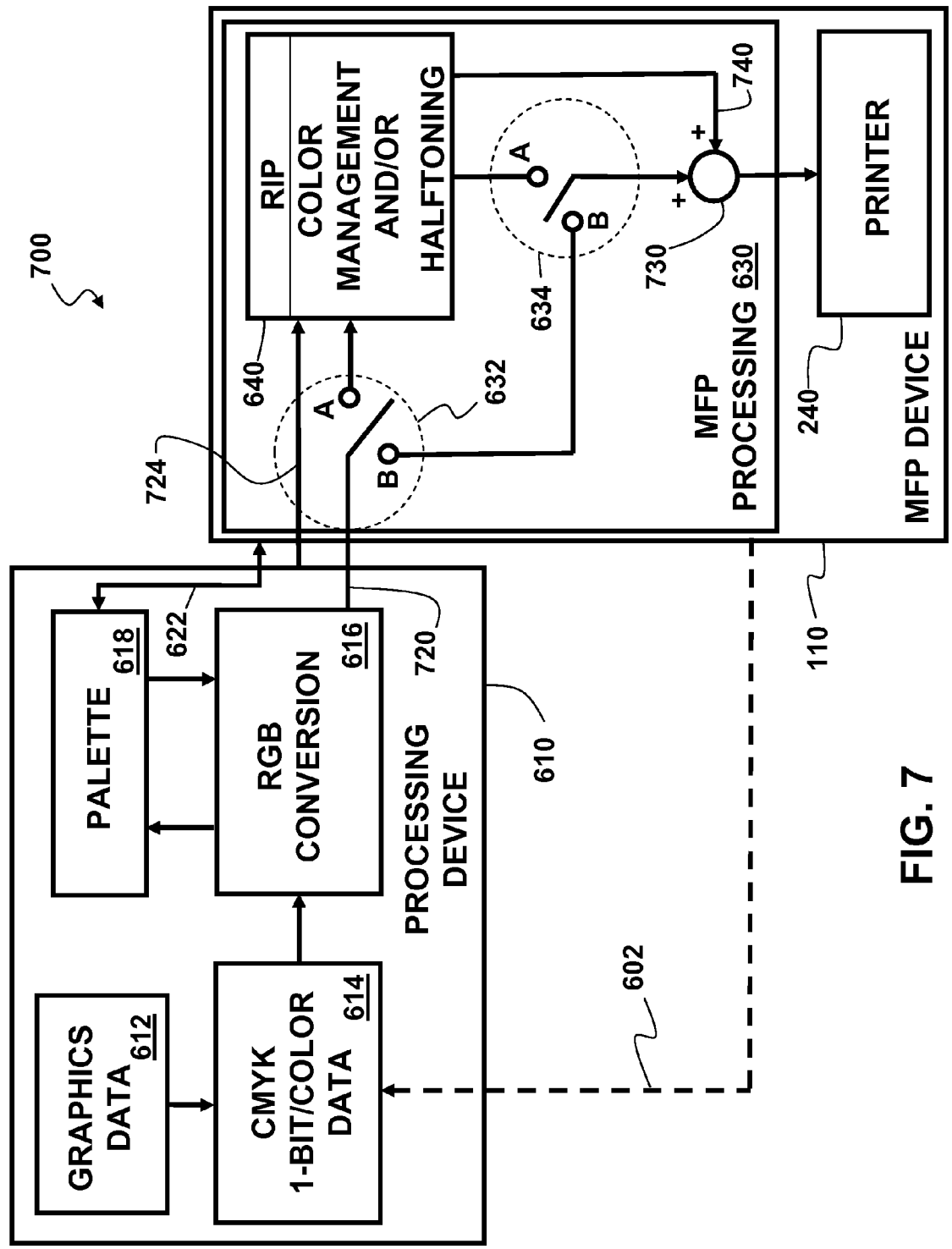
FIG. 7 illustrates a top level functional block diagram of another exemplary device in communication with another exemplary MFP device.

FIG. 7 illustrates a system 700 where the MFP device 110 may send color calibration parameters and output tray orientation or other print media orientation state information 602 to the processing device 610. The processing device operates on graphics data 612 by scaling bitmaps having pixel depths greater than four to a depth of four bits per pixel and rasterizing the data in exemplary formats, such as lines or blocks, i.e., bands or rectangles that may then be halftoned into 1-bit CMYK data. The rasterizing, particularly the halftoning, at this stage (stage 614) may be based on the color calibration parameters and/or the MFP device output tray orientation 602. The exemplary 1-bit CMYK data of the exemplary stage of rasterizing with halftoning (stage 614) may then be converted at the RGB conversion stage (stage 616) based on the selected palette 618 as exemplified, as shown in the tabular forms in FIG. 5. The processing device 610 may send a print job comprised of the converted bitmaps 720, and texts and vectors 724, for example, in a PDL to the MFP device 110 that includes a flag 622 that may be included with the PDL of the print job 720. The flag 622 may be implemented as a PJL command. The flag 622, that is, the need for a bypass, may also, or instead, be derived by the frequency of black entries in the selected palette where the frequency, e.g., eight in the exemplary palette of FIG. 5, may be indicative of the need for a processing bypass. The MFP device 110 of FIG. 7 is illustrated having MFP processing 630 that may include RIP hardware or hardware/software, or firmware, that may convert images described in vector graphic statements 724 into raster graphics or bitmaps. The RIP 640 may output the bitmaps based on a color management module and/or halftoning rules. The flag 622 may be read by the MFP processing 630 of the MFP device 110 so that the previously rasterized portion 720 of the print job may be sent to the output of the RIP for combining 730 with the rasterized text and vector RIP output 740 for printing via the printer 240 of the MFP device 110. FIG. 7 illustrates this exemplary bypass with a pair of switches 632, 634 where the switches would be in state "A" when the selected palette is not used. When the selected palette is used, that is, if the data being sent to the MFP device 110 was graphics data that had undergone 4-bit RGB conversion from CMYK 1-bit color data according to a selected palette, then the exemplary MFP processing 630 places the switches in state "B" and thereby bypasses color management operations and/or halftoning steps and rasterizing. Accordingly, in the example of FIG. 7, the halftoned CMYK 1-bit data is mapped as 4-bit RGB data that may be routed to the output of the RIP firmware, combined with the rasterized text and/or vector graphic statements 740 and sent to the printer 240 of the MFP device 110.

While CMYK was applied, by example, non-CMYK four-color schemes may be embodied with little if any change in structure and/or processing. The invention may be embodied via alternative printing systems. For example, a system having quantized colors that may be expressed as four bits or eight bits may be encoded in a four-bit or eight-bit indexed RGB. PANTONE™ inks implemented via four bits-per-pixel (bpp) supports four inks and PANTONE™ inks implemented via eight bits-per-pixel (bpp) supports eight inks, where one may interleave the bits to generate a palette. Six-ink printing may be embodied where a single bit per ink color is allocated in an eight bit-per-pixel (bpp) array where two bits are ignored. In a seven-color system where RGB is added to CMYK, the embodiment may have seven of eight bits-per-pixel allocated in the array to address the color, and a single bit is ignored.

Figure 8:
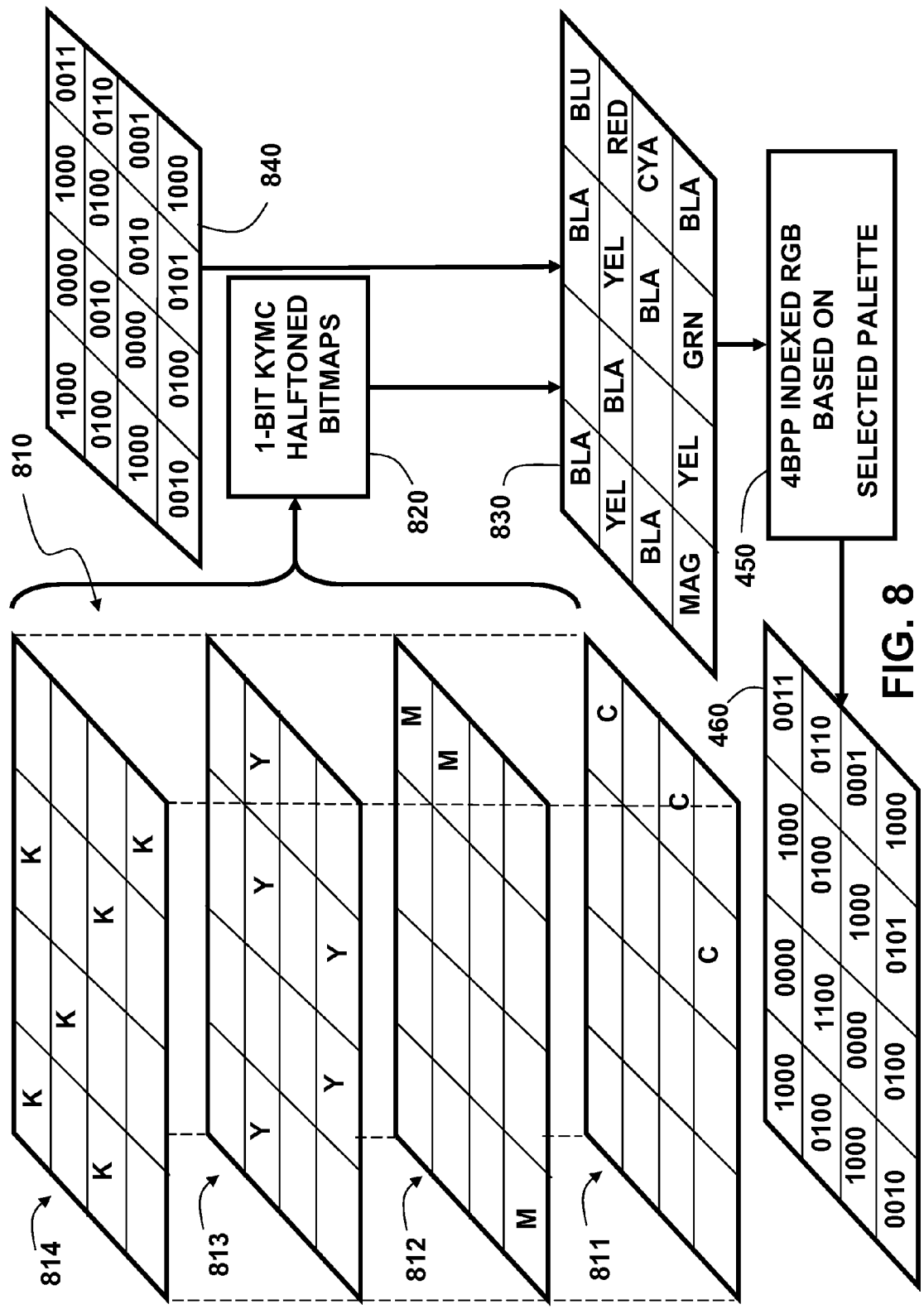
FIG. 8 is a graphical depiction of an exemplary conversion from 1-bit KYMC halftoned bitmaps to 4-bpp indexed RGB.

For example, another embodiment shown in the graphical depiction of FIG. 8, an exemplary conversion is made from 1-bit KYMC halftoned bitmaps to 4-bpp indexed RGB. FIG. 8 depicts graphically the mapping of a portion of an image which, in this example, is a four-by-four set of 4-bit pixel depth 810 where each bit is represented in a color plane or bitmap level of depth, i.e., single bit-per-pixel (1-bpp) halftoned KYMC data. The bottom exemplary plane 811 represents a halftoned 1-bit cyan, C, bitmap. The next exemplary plane 812 above the cyan bitmap represents a halftoned 1-bit magenta, M, bitmap. The next exemplary plane 813 above the magenta bitmap represents a halftoned 1-bit yellow, Y, bitmap. The top exemplary plane 814 represents the halftoned 1-bit black, K, bitmap. These four planes 811-814, when aligned, express as 1-bit planes a 4-bit bitmap. Applying the KYMC scheme 820 to these 1-bit planes 811-814 of a bitmap, the resulting 4-bit bitmap 830 may be expressed in exemplary fashion as black (BLA←K), blue (BLU←C+M), yellow (YEL←Y), red (RED←M+Y), cyan (CYA←C), magenta (MAG←M), and green (GRN←C+Y). Rather than represent the color information for a bitmap in the four planes 811-814, the information may be represented in an interleaved bitmap 840 where, in this example, a 1-bit level of a color component may be expressed by a "1" and in the order of the KYMC scheme. That is, the colors may be expressed in exemplary fashion as black (BLA←1000), blue (BLU←0011), yellow (YEL←0100), red (RED←0110), cyan (CYA←0001), magenta (MAG←0010), and green (GRN←0101). Whether originating from an expression in planes 811-814 or as interleaved colors 840 of RGB data or RGB color spaces, or non-RGB data or non-RGB color spaces, the 4-bits per pixel (bpp) representation 830, in this example, may be mapped 450, based on a selected palette and according to 4-bbp indexed RGB 460.

Figure 10:
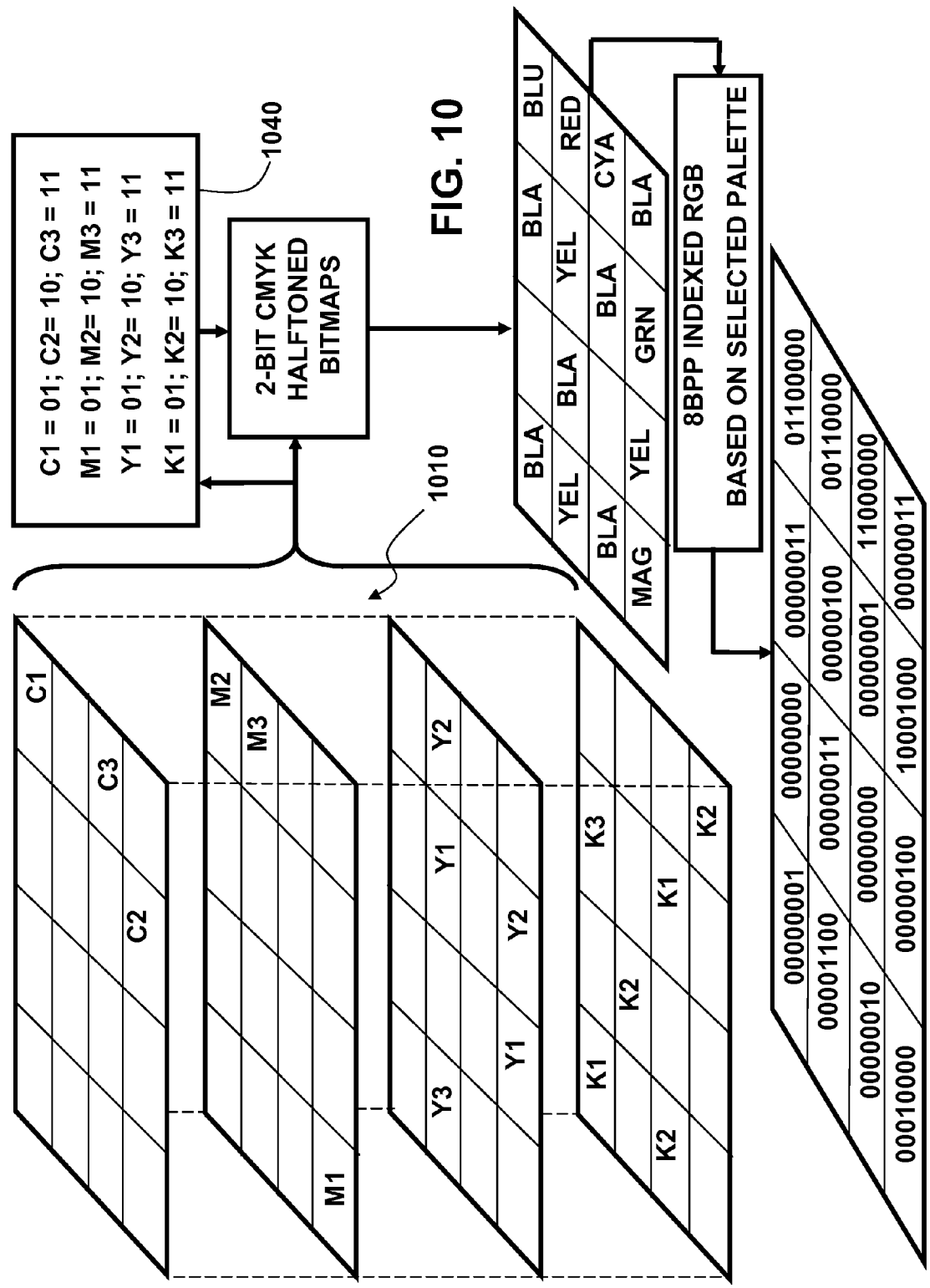
FIG. 10 is a graphical depiction of an exemplary conversion from 2-bit CMYK halftoned bitmaps to 4-bpp indexed RGB.

FIG. 9 is a tabular depiction of an exemplary palette expressed as 4-bpp indexed RGB from the 1-bit KYMC halftoned bitmaps or directly provided interleaved data. FIG. 10 depicts another embodiment having 2-bit CMYK halftoned bitmaps, and illustrates a graphical depiction of an exemplary conversion from 2-bit CMYK halftoned bitmaps to 4-bpp indexed RGB. As explained above in the 1-bit examples of FIGS. 6 and 8, as an exemplary alternative to four color planes 1010, an interleaved bitmap may represent the colors in each pixel and in this case, two bits would be allotted 1040 to define the level for each of the four components in a CMYK representation, resulting in an 8-bit expression in the interleaved CMYK representation. FIG. 11 is a tabular depiction of an exemplary palette expressed as 8-bpp indexed RGB 2-bit from the CMYK halftoned bitmap or directly provided interleaved data. The indexed RGB embodiments may include grayscales and FIG. 12 is a tabular depiction of an exemplary palette for grayscale expressed as 4-bpp indexed RGB.

One of ordinary skill in the art will also appreciate that the modules, elements and/or functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computer-implemented method of encoding bitmap data as indexed red-green-blue (RGB) data for printing comprising:
    selecting a pixel array comprising a plurality of pixels, each pixel comprising an ordered set of bits representing a level of at least one color of non-RGB data;
    selecting, in a physical processing device, an indexed RGB palette, wherein the indexed RGB palette is indexed for sixteen colors;
    applying, for each pixel of the pixel array, an index value equivalent of the ordered set of bits to determine the color of the pixel according to the selected indexed RGB palette; and
    outputting the pixel array according to the selected indexed RGB palette and outputting a raster image processing bypass indicator, wherein the bypass indicator is determined based on a frequency of black entries in the selected indexed RGB palette.

2. The computer-implemented method of claim 1 further comprising, prior to the step of selecting a pixel array, providing a set of member pixel arrays comprising:
    a first pixel array representing, via a state for each pixel of the first pixel array, a first primary color bitmap;
    a second pixel array representing, via a state for each pixel of the second pixel array, a second primary color bitmap;
    a third pixel array representing, via a state for each pixel of the third pixel array, a third primary color bitmap; and
    a fourth binary pixel array representing, via a state for each pixel of the fourth pixel array, a black bitmap; and
    combining, the set of member pixel arrays by associating pixels across a plurality of member pixel arrays according to a shared relative location in two-space to form a combined pixel array wherein each pixel of the combined pixel array comprises an ordered set of bits representing the respective states of each of the associated pixels across the member pixel arrays.

3. The computer-implemented method of claim 2 wherein at least one of the first pixel array, second pixel array, third pixel array and fourth pixel array comprise an array comprising 1-bit pixels.

4. The computer-implemented method of claim 2 wherein at least one of the first pixel array, second pixel array, third pixel array and fourth pixel array comprise an array comprising 2-bit pixels.

5. The computer-implemented method of claim 1 wherein the selected indexed RGB palette is indexed for 256 colors.

6. The computer-implemented method of claim 1 further comprising the step of combining the pixel array with an output of the raster image processing.

7. The computer-implemented method of claim 1 further comprises the steps of outputting the pixel array according to the selected indexed RGB palette, outputting the selected palette, and determining the raster image processing bypass based on the output selected palette.

8. The computer-implemented method of claim 2 wherein at least one of the first pixel array, second pixel array, third pixel array and fourth pixel array comprise a halftone set of member pixel arrays.

9. The computer-implemented method of claim 2 further comprising the step of inputting color calibration data of a printing device wherein the step of providing a set of member pixel arrays further comprises providing the set of member pixel arrays based on the color calibration data.

10. The computer-implemented method of claim 9 wherein the step of providing a set of member pixel arrays further comprises halftoning the set of member pixel arrays based on the color calibration data and a print output orientation.

11. A processing device configured to encode bitmap data as indexed red-green-blue (RGB) data for printing, the processing device comprising a processor and accessible memory, wherein the processor is configured to:
   input a pixel array comprising a plurality of pixels, each pixel comprising an ordered set of bits representing a level of at least one color of non-RGB data;
   reference an indexed RGB palette, wherein the indexed RGB palette is indexed for sixteen colors;
   apply, for each pixel of the pixel array, an index value equivalent of the ordered set of bits to determine the color of the pixel according to the indexed RGB palette; and
   output the pixel array according to the indexed RGB palette and output a raster image processing bypass indicator, wherein the bypass indicator is determined based on a frequency of black entries in the selected indexed RGB palette.

12. The processing device of claim 11 wherein the processor of the processing device further configured to execute instructions to:
   input, from graphics data, the set of member pixel arrays, the set of members comprising:
      a first pixel array representing, via a state for each pixel of the first pixel array, a first primary color bitmap;
      a second pixel array representing, via a state for each pixel of the second pixel array, a second primary color bitmap;
      a third pixel array representing, via a state for each pixel of the third pixel array, a third primary color bitmap; and
      a fourth binary pixel array representing, via a state for each pixel of the fourth pixel array, a black bitmap; and
   combine a set of member pixel arrays by associating pixels across the member pixel arrays according to a shared relative location in two-space to form a combined pixel array wherein each pixel of the combined pixel array comprises an ordered set of bits representing the respective states of each of the associated pixels across the member pixel arrays.

13. The processing device of claim 12 wherein at least one of the first pixel array, second pixel array, third pixel array and fourth pixel array comprise an array comprising 1-bit pixels.

14. The processing device of claim 12 wherein at least one of the first pixel array, second pixel array, third pixel array and fourth pixel array comprise an array comprising 2-bit pixels.

15. The processing device of claim 11 wherein the indexed RGB palette is indexed for 256 colors.

16. The processing device of claim 11 wherein the processor is further configured to execute instructions to combine the pixel array with output data of a raster image processing bypass indicator.

17. The processing device of claim 11 wherein the processor is further configured to execute instructions to: output the pixel array according to the indexed RGB palette and output the indexed RGB palette wherein the indexed RGB palette comprises a quantity of indices for black; wherein the quantity as a value is a raster image processing bypass indicator.

18. The processing device of claim 11 wherein the processing device further comprises a receiving portion adapted to receive color calibration data of a printing device and the processor is further configured to generate, from graphics data and based on received color calibration data, the set of member pixel arrays.

19. The processing device of claim 18 wherein the processor is further configured to execute instructions to halftone the set of member pixel arrays based on the color calibration data.

20. A system configured to encode color bitmap data as indexed red-green-blue (RGB) data and bypass raster image processing for printing, the system comprising:
   a processing device comprising: a processor and accessible memory, wherein the processor is configured to execute instructions to: input a pixel array comprising a plurality of pixels, each pixel comprising an ordered set of bits representing a level of at least one color of non-RGB data;
   reference an indexed RGB palette, wherein the indexed RGB palette is indexed for sixteen colors;
   apply, for each pixel of the pixel array, an index value equivalent of the ordered set of bits to determine the color of the pixel according to the indexed RGB palette; and
   output the pixel array according to the indexed RGB palette and output a raster image processing bypass indicator; and
   send the pixel array according to the indexed RGB palette to the printer based on the raster image processing bypass indicator; wherein the bypass indicator is determined based on a frequency of black entries in the selected indexed RGB palette; and
   a multi-function peripheral (MFP) device comprising:
   a printer;
   a raster image processor configured to output rasterized data to the printer; and
   a raster image processor bypass circuit configured to send the pixel array according, to the indexed RGB palette, to the primer.

21. The system of claim 20 wherein the processor of the processing device is further configured to:
   input, from graphics data, the set of member pixel arrays, the set of members comprising:
      a first pixel array representing, via a state for each pixel of the first pixel array, a first primary color bitmap;
      a second pixel array representing, via a state for each pixel of the second pixel array, a second primary color bitmap;
      a third pixel array representing, via a state for each pixel of the third pixel array, a third primary color bitmap; and
      a fourth binary pixel array representing, via a state for each pixel of the fourth pixel array, a black bitmap; and
   combine a set of member pixel arrays by associating pixels across the member pixel arrays according to a shared relative location in two-space to form a combined pixel array wherein each pixel of the combined pixel array comprises an ordered set of bits representing the respective states of each of the associated pixels across the member pixel arrays.

22. The system of claim 21 wherein at least one of the first pixel array, second pixel array, third pixel array and fourth pixel array of the processing device comprise an array comprising 1-bit pixels.

23. The system of claim 21 wherein at least one of the first pixel array, second pixel array, third pixel array and fourth pixel array of the processing device comprise an array comprising 2-bit pixels.

24. The system of claim 20 wherein the indexed RGB palette of the processing device is indexed for 256 colors.

25. The system of claim 20 wherein the MFP is configured to effect the means for bypassing the raster image processor.

26. The system of claim 23 wherein the processor of the processing device is further configured to execute instructions to combine the pixel array with output data of raster image processing and wherein the MFP is configured to effect the means for bypassing the image raster image processor and send the pixel array according to the indexed RGB palette to the printer based on the raster image processing bypass indicator and the MFP further comprises means for combining the pixel array with the output data of raster image processing.

27. The system of claim 20 wherein the processor of the processing device is further configured to execute instructions to: output the pixel array according to the indexed RGB palette and output the indexed RGB palette wherein the indexed RGB palette comprises a quantity of indices for black; wherein the quantity as a value is a raster image processing bypass indicator and wherein the MFP is configured to bypass the raster image processor and send the pixel array according to the indexed RGB palette to the printer based on the raster image processing bypass indicator.

28. The system of claim 20 wherein the processing device further comprises a receiving portion adapted to receive color calibration data of a printing device and the processor is further configured to generate, from graphics data and based on received color calibration data, the set of member pixel arrays.

29. The system of claim 28 wherein the processor of the processing device is further configured to execute instructions to halftone the set of member pixel arrays based on the color calibration data.

30. The computer-implemented method of claim 1 further comprising:
    encoding, in the physical processing device, bitmap data as indexed RGB data based on the determined color of the pixel according to the selected indexed RGB palette.

31. The computer-implemented method of claim 1 wherein the frequency of black entries in the selected indexed RGB palette is indicative of the need for a processing bypass.

32. The computer-implemented method of claim 1 further comprising scaling bitmap data that comprises pixel depths greater than four to a depth of four bits per pixel.

33. The computer-implemented method of claim 32 further comprising rasterizing the bitmap data and then halftoning the bitmap data into 1-bit cyan-magenta-yellow-black (CMYK) data.

* * * * *